United States Patent
Seagle et al.

(10) Patent No.: US 11,990,162 B2
(45) Date of Patent: May 21, 2024

(54) INDEPENDENT READER/WRITER OVERCOATS FOR AN SGV TAPE HEAD

(71) Applicant: Western Digital Technologies, Inc., San Jose, CA (US)

(72) Inventors: David J. Seagle, Morgan Hill, CA (US); Robert G. Biskeborn, Hollister, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/954,089

(22) Filed: Sep. 27, 2022

(65) Prior Publication Data
US 2024/0105218 A1    Mar. 28, 2024

(51) Int. Cl.
*G11B 5/255*    (2006.01)
*G11B 5/008*    (2006.01)

(52) U.S. Cl.
CPC .......... *G11B 5/255* (2013.01); *G11B 5/00813* (2013.01)

(58) Field of Classification Search
None
See application file for complete search history.

(56) References Cited

U.S. PATENT DOCUMENTS

| | | | |
|---|---|---|---|
| 6,433,965 B1 | 8/2002 | Gopinathan et al. | |
| 7,916,424 B2 | 3/2011 | Biskeborn | |
| 8,861,318 B1 * | 10/2014 | Lee | G11B 5/6082 369/13.33 |
| 9,001,463 B2 * | 4/2015 | Biskeborn | G11B 5/3912 360/122 |
| 9,053,718 B1 | 6/2015 | Adrong et al. | |
| 9,659,587 B1 | 5/2017 | Khamnualthong et al. | |
| 11,222,655 B1 * | 1/2022 | Zhang | G11B 5/255 |
| 2008/0068752 A1 * | 3/2008 | Biskeborn | G11B 5/0083 |
| 2008/0266711 A1 | 10/2008 | Nibarger et al. | |
| 2010/0149685 A1 * | 6/2010 | Yari | G11B 5/102 427/127 |
| 2010/0269565 A1 | 10/2010 | Biskeborn et al. | |
| 2014/0063646 A1 * | 3/2014 | Biskeborn | G11B 5/3967 360/75 |
| 2016/0372142 A1 | 12/2016 | Biskeborn et al. | |
| 2018/0068678 A1 * | 3/2018 | Biskeborn | G11B 5/4893 |

OTHER PUBLICATIONS

"Family 3592+14 IBM TS1160 Tape Drive Model 60G", IBM Japan Sales Manual, Apr. 19, 2022, pp. 1-14, <https://www.ibm.com/common/ssi/ShowDoc.wss?docURL=/common/ssi/rep_sm/4/760/ENUS3592-_h14/index.html&lang=en&request_locale=en>.

* cited by examiner

*Primary Examiner* — William J Klimowicz
(74) *Attorney, Agent, or Firm* — PATTERSON + SHERIDAN, LLP

(57) ABSTRACT

The present disclosure generally relates to a tape head and a tape head drive including a tape head. The tape head comprises at least one same gap verify (SGV) module comprising a closure, a substrate, and a plurality of write transducer and read transducer pairs disposed between the substrate and the closure. The write transducer and the read transducer of each pair are aligned in a first direction and spaced a distance in the downtrack direction of about 5 μm to about 20 μm. A first overcoat is disposed over each write transducer at a media facing surface (MFS), and a second overcoat is disposed over each read transducer at the MFS. The first and second overcoats may comprise different materials, and are deposited during different processes.

22 Claims, 8 Drawing Sheets

INDEPENDENT READER/WRITER OVERCOATS FOR AN SGV TAPE HEAD

BACKGROUND OF THE DISCLOSURE

Field of the Disclosure

Embodiments of the present disclosure generally relate to a tape head and a tape head drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a position over the media where the data is to be stored. The magnetic write transducer then generates a magnetic field, which encodes the data into the magnetic media. Data is read from the media by similarly positioning the magnetic read transducer and then sensing the magnetic field of the magnetic media.

In a tape drive system, the quantity of data stored on a magnetic tape may be increased by increasing the number of data tracks across the tape that the tape head is capable of writing to. By overlapping portions of data tracks (e.g., shingling data tracks), improvements to data storage quantities can be achieved. However, for various reasons, enabling read-verify for conventional tape heads requires use of two or more separate head structures, where one structure writes the data and the other read-verifies the data. A drawback is that the separate structures in conventional heads must be very precisely assembled to enable this function. Another drawback is that the heads are more susceptible to m is-registration between reader and upstream writer caused by tape skew, as a result of the unavoidable separation between the two. Yet another drawback is the time delay between the writing and the read-verifying may lead to a loss of data due to having to re-write larger blocks of data when an uncorrectable error occurs.

Therefore, there is a need in the art for a tape head configured to write and read verifying data within a single head structure.

SUMMARY OF THE DISCLOSURE

The present disclosure generally relates to a tape head and a tape head drive including a tape head. The tape head comprises at least one same gap verify (SGV) module comprising a closure, a substrate, and a plurality of write transducer and read transducer pairs disposed between the substrate and the closure. The write transducer and the read transducer of each pair are aligned in a first direction and spaced a distance in the downtrack direction of about 5 µm to about 20 µm. A first overcoat is disposed over each write transducer at a media facing surface (MFS), and a second overcoat is disposed over each read transducer at the MFS. The first and second overcoats may comprise different materials, and are deposited during different processes.

In one embodiment, a SGV module head assembly comprises a closure, a plurality of write transducers disposed in a first row on the closure, the plurality of write transducers being coated with a first overcoat at a MFS, a plurality of read transducers disposed in a second row adjacent to the first row on the closure, each read transducer being paired with an adjacent write transducer, and each write transducer and read transducer of each pair being aligned in a downtrack direction, wherein each read transducer is coated with a second overcoat at the MFS, the second overcoat having a greater thickness than the first overcoat, and a substrate disposed adjacent to the second row, wherein at least a portion of the substrate is coated with the second overcoat at the MFS.

In another embodiment, a method of fabricating a SGV module head assembly comprises forming a plurality of write transducers in a first row adjacent to a closure and a plurality of read transducers in a second row adjacent to the first row and a substrate, each read transducer being paired with an adjacent write transducer, and each write transducer and read transducer of each pair being aligned in a downtrack direction, wherein each read transducer is coated with a second overcoat at a MFS, depositing a first overcoat on the plurality of write transducers, the plurality of read transducers, at least a portion of the closure, and at least a portion of the substrate at the MFS, depositing a photoresist over at least the plurality of write transducers, removing portions of the first overcoat uncovered by the photoresist, depositing a second overcoat on the plurality of read transducers, at least a portion of the closure, and at least a portion of the substrate at the MFS, and removing the photoresist.

In yet another embodiment, a SGV module head assembly comprises a substrate, a plurality of write transducers disposed in a first row on the substrate, the plurality of write transducers being coated with a first overcoat at a MFS, a plurality of read transducers disposed in a second row adjacent to the first row, each read transducer being coated with a second overcoat at the MFS, a plurality of null shields disposed in a third row between the first row and the second row, wherein each read transducer is paired with an adjacent write transducer and an adjacent null shield, each write transducer, read transducer, and null shield of each pair being aligned in a downtrack direction, and a closure disposed adjacent to the second row, wherein at least a portion of the closure is coated with the second overcoat at the MFS, wherein the first overcoat and the second overcoat are deposited at different times and in different processes during fabrication.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head and a tape head drive including a tape head. The tape head comprises at least one same gap verify (SGV) module comprising a closure, a substrate, and a plurality of write transducer and read transducer pairs disposed between the substrate and the closure. The write transducer and the read transducer of each pair are aligned in a first direction and spaced a distance in the downtrack direction of about 5 µm to about 20 µm. A first overcoat is disposed over each write transducer at a media facing surface (MFS), and a second overcoat is disposed over each read transducer at the MFS. The first and second overcoats may comprise different materials, and are deposited during different processes.

Figure 1A:
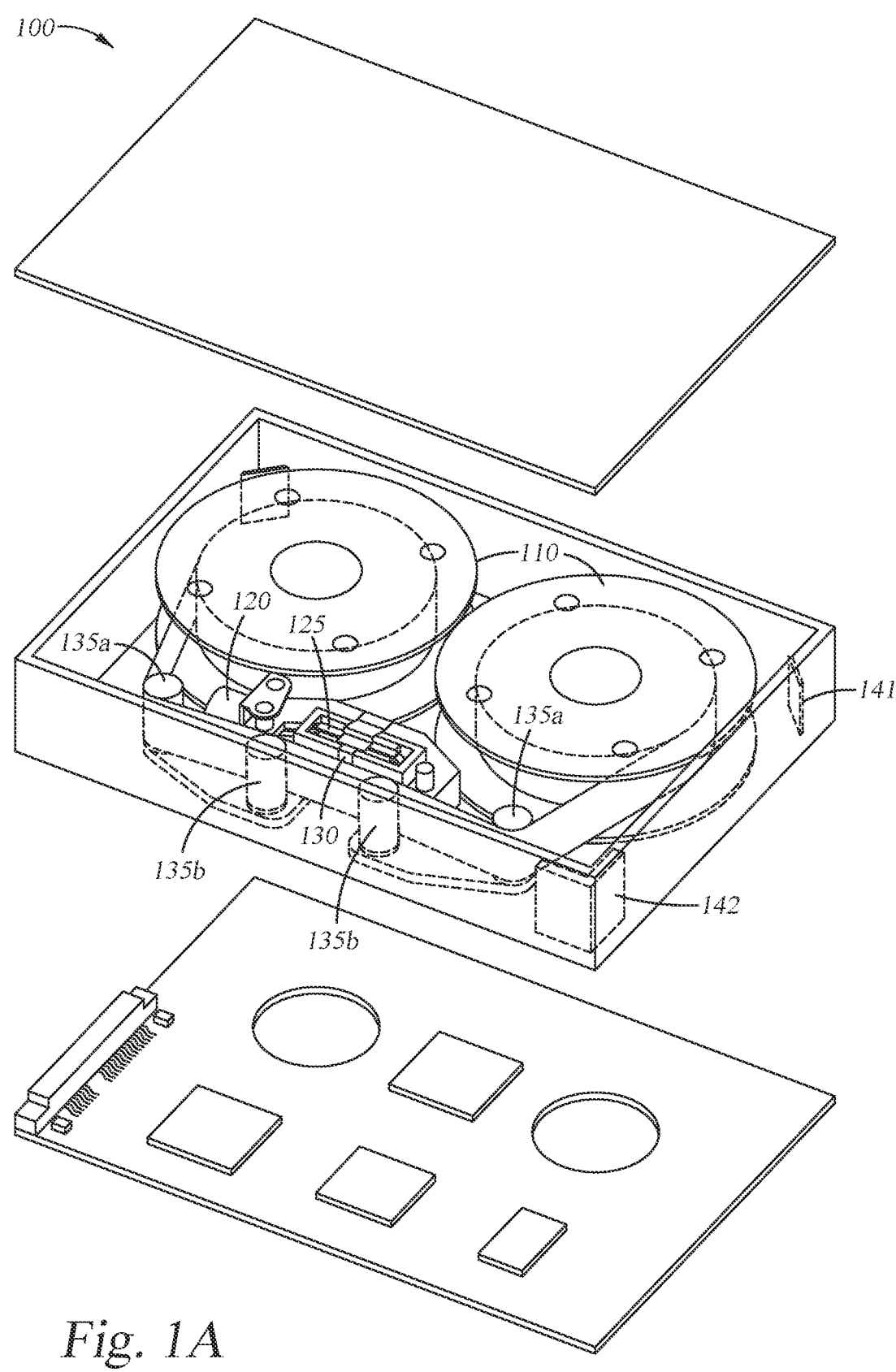
FIGS. 1A-1C illustrate a perspective exploded view, a simplified top down, and side profile view of a tape embedded drive, in accordance with some embodiments.
Figure 1B:
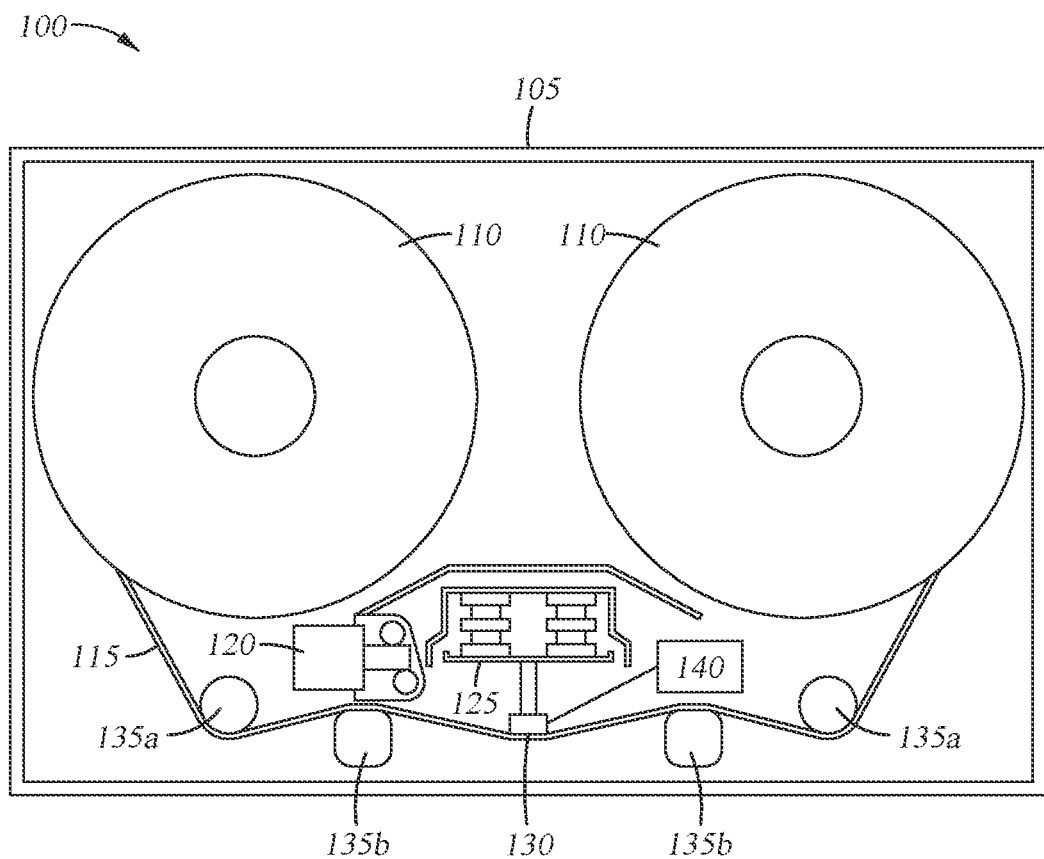
Figure 1C:
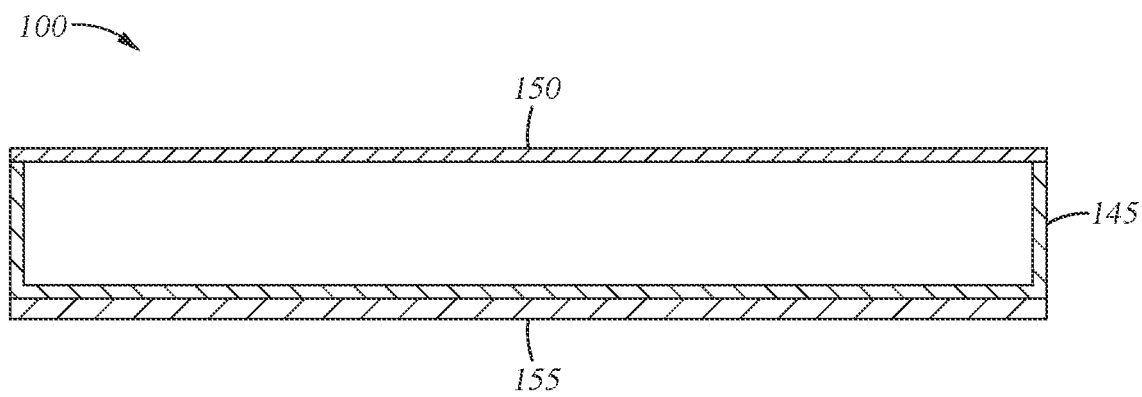

FIGS. 1A-1C illustrate a perspective exploded view, a simplified top down, and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape embedded drive 100. In such embodiments, the tape embedded drive 100 may no longer be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape embedded drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 2:
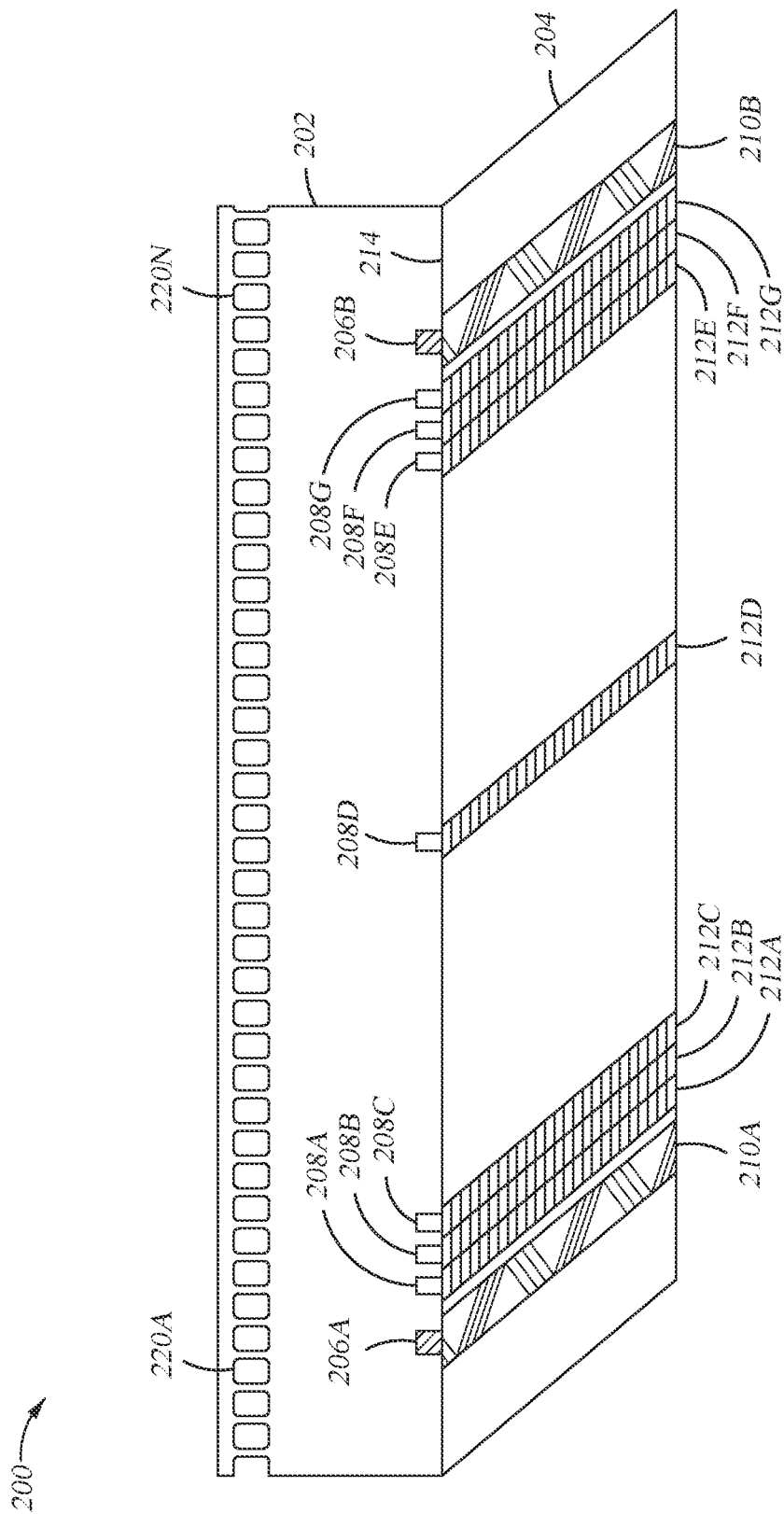
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
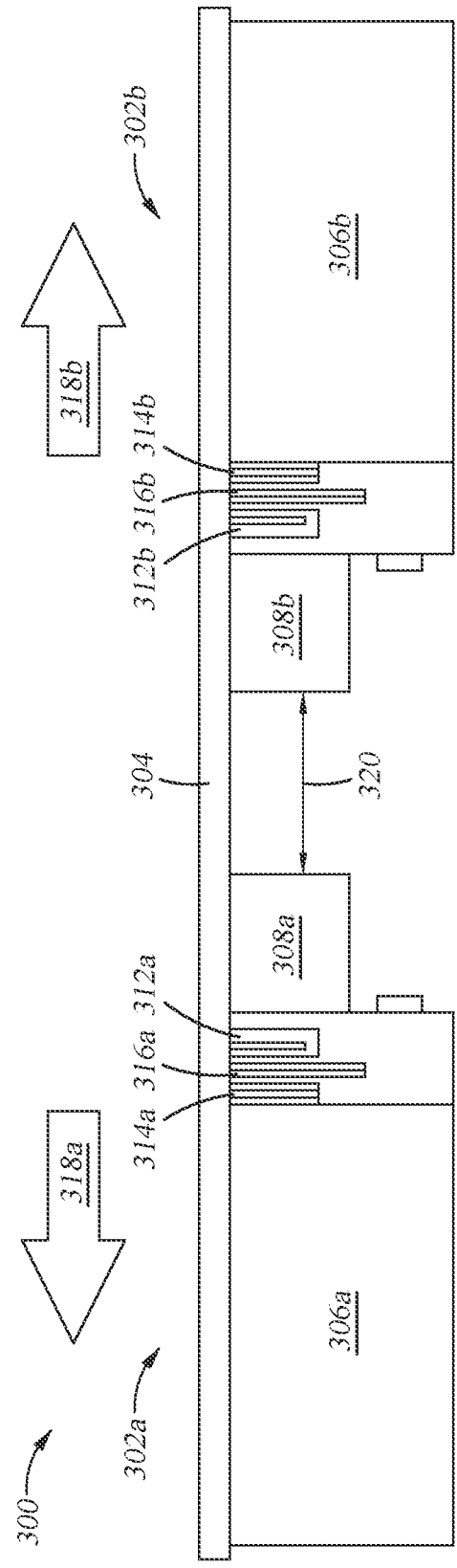
FIG. 3A illustrates a side view of a tape head comprising two same gap verify (SGV) module head assemblies, according to one embodiment.
Figure 3B:
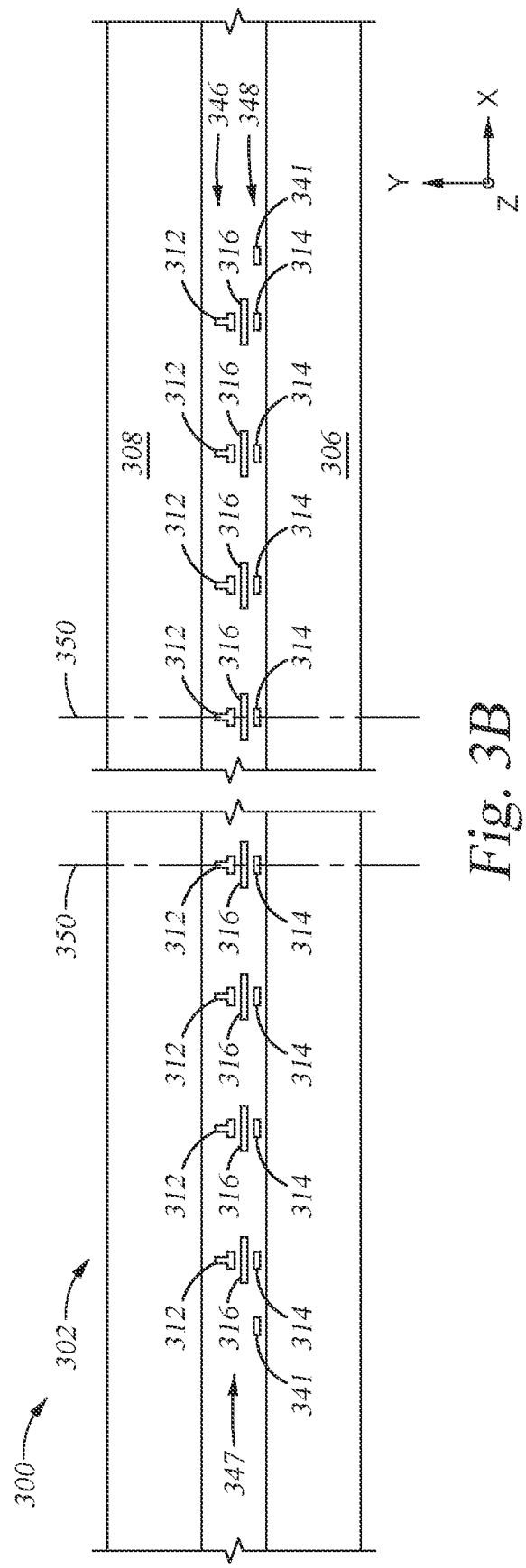
FIG. 3B illustrates a media facing surface (MFS) view of the tape head comprising the two SGV module head assemblies of FIG. 3A, according to one embodiment.

FIGS. 3A-3B illustrate various views of a tape head 300 comprising one or more same gap verify (SGV) module head assemblies 302, according to various embodiments. FIG. 3A illustrates a side view of a tape head 300 comprising two SGV module head assemblies 302a, 302b, according to one embodiment. FIG. 3B illustrates a media facing surface (MFS) view of the tape head 300 comprising the two SGV module head assemblies 302a, 302b of FIG. 3A, according to one embodiment.

The tape head 300 may be utilized within a tape drive comprising a controller, such as the TED 100 of FIG. 1A or an LTO drive. The tape head 300 may be the tape head 200 of FIG. 2. The tape head 300 comprises a first SGV module head assembly 302a and a second SGV module head assembly 302b. The first SGV module head assembly 302a may be referred to as a first SGV module 302a, and the second SGV module head assembly 302b may be referred to as a second SGV module 302b. One SGV module head assembly 302a, 302b may be referred to as a SGV module 302 or a SGV module head assembly 302.

As shown in FIG. 3A, the first SGV module 302a comprises a first closure 308a, one or more first write transducers 312a disposed adjacent to the first closure 308a, a first null shield 316a disposed adjacent to the one or more first write transducers 312a, one or more first read transducers 314a disposed adjacent to the first null shield 316a, and a first substrate 306a disposed adjacent to the one or more first read transducers 314a. The one or more first write transducers 312a may be referred to herein as one or more first writers 312a, and the one or more first read transducers 314a may be referred to herein as one or more first readers 314a. Each of the one or more first writers 312a, the one or more first readers 314a, and the one or more first null shields 316a are disposed on the first substrate 306a. It is noted that while only one first writer 312a and one first reader 314a are shown in the first SGV module 302a of the tape head 300 of FIG. 3A, the first SGV module 302a may comprise one or more first writers 312a and one or more first readers 314a, as described in FIG. 3B below.

Similarly, the second SGV module 302b comprises a second closure 308b, one or more second write transducers 312b disposed adjacent to the second closure 308b, a second null shield 316b disposed adjacent to the one or more second write transducers 312b, one or more second read transducers 314b disposed adjacent to the second null shield 316b, and a second substrate 306b disposed adjacent to the one or more second read transducers 314b. The one or more second write transducers 312b may be referred to herein as one or more second writers 312b, and the one or more second read transducers 314b may be referred to herein as one or more second readers 314b. Each of the one or more second writers 312b, the one or more second readers 314b, and the one or more second null shields 316b, are disposed on the second substrate 306b. It is noted that while only one second writer 312b and one second reader 314b are shown in the second SGV module 302b of the tape head 300 of FIG. 3A, the second SGV module 302b may comprise one or more second writers 312b and one or more second readers 314b, as described in FIG. 3B below.

The first and second writers 312a, 312b may be referred to as a writer 312, either collectively or individually. The first and second readers 314a, 314b may be referred to as a reader 314, either collectively or individually. The first and second null shields 316a, 316b may be referred to as a null shield 316, either collectively or individually.

The null shield 316 comprises a soft ferromagnetic alloy, such as 80/20 NiFe for example, and the thickness and placement of the null shield 316 may vary. The null shield 316 is optional. Examples of the SGV modules comprising null shields are described in co-pending patent application titled "Tape Head Design Having A Null Shield For Same Gap Verify," U.S. application Ser. No. 17/359,046, filed Jun. 25, 2021, assigned to the same assignee of this application, which is herein incorporated by reference.

In one embodiment, even without the optional null shield 316, the first SGV module 302a and the second SGV module 302b are arranged in a face-to-face configuration or arrangement such that the first closure 308a of the first SGV module 302a is disposed adjacent to the second closure 308b of the second SGV module 302b. In other words, the first SGV module 302a is a mirror image of the second SGV module 302b, where the second SGV module 302b is a right hand module and the first SGV module 302a is a left hand module. The first SGV module 302a is spaced a distance 320 from the second SGV module 302b of about 500 µm to about 1000 µm. A MFS of each of the first and second SGV modules 302a, 302b is configured to support or face a tape 304 or other magnetic media. The tape 304 is configured to move over the first and second SGV modules 302a, 302b in both the x-direction and the −x-direction. The first SGV module 302a has a first writing and reading direction 318a that is opposite to a second writing and reading direction 318b of the second SGV module 302b.

As the tape 304 or other media moves in the first writing and reading direction 318a (i.e., the −x-direction), the one or more first writers 312a of the first SGV module 302a are able to write data to the tape 304, and the one or more first readers 314a are able to immediately read verify the data newly written to the tape 304. Similarly, as the tape 304 or other media moves in the second writing and reading direction 318b (i.e., the x-direction), the one or more second writers 312b of the second SGV module 302b are able to write data to the tape 304, and the one or more second readers 314b are able to immediately read verify the data newly written to the tape 304. As such, both the first SGV module 302a and the second SGV module 302b are individually able to write data to and read verify data from a tape concurrently.

FIG. 3B illustrates a MFS view of a SGV module head assembly 302 of the tape head 300 of FIG. 3A, according to one embodiment. The SGV module 302 of FIG. 3B may be either the first SGV module 302a or the second SGV module 302b of FIG. 3A. Thus, the SGV module 302 may refer to or be used interchangeably with either the first SGV module 302a or the second SGV module 302b of FIG. 3A.

The SGV module 302 shown in FIG. 3B comprises a plurality of writers 312, a plurality of null shields 316, and a plurality of readers 314 forming a plurality of writer 312 and reader 314 pairs. Each writer 312 and reader 314 pair comprises an optional null shield 316 disposed between the writer 312 and the reader 314. The plurality of writers 312 are disposed in a first row 346 in the z-direction adjacent to the closure 308, and the plurality of readers 314 are disposed in a second row 348 in the z-direction adjacent to the substrate 306. The plurality of optional null shields 316 are disposed in a third row 347 between the first row 346 and the second row 348. Each writer 312 is disposed adjacent to and aligned in the x-direction and in the z-direction with a reader 314 and a null shield 316 to form a writer 312 and reader 314 pair. In some embodiments, the writer 312, the reader 314, and the null shield 316 of each pair are both aligned along a center axis 350 in the x-direction. Each writer 312 is spaced a distance in the x-direction from an adjacent paired reader 314 of about 5 µm to about 20 µm, such as about 5 µm to about 15 µm. The closure 308 is spaced a distance in the x-direction from the substrate 306 of about 20 µm to about 100 µm.

As used herein, a writer 312 and reader 314 pair refers to a writer 312, a null shield 316, and a reader 314 that are disposed adjacent to one another, and are aligned with one another in at least the x-direction and the z-direction. The writer 312 and the reader 314 of each pair may be either aligned or offset from one another in the y-direction. The SGV module 302 further comprises one or more servo read transducers 341, or servo readers 341. The one or more servo readers 341 are disposed in the second row 348 and are aligned in the z-direction with the plurality of readers 314. Further details of the writers 312 and readers 314 are shown below in FIG. 5.

While not shown in FIG. 3B, the plurality of writers 312, the plurality of null shields 316, and the plurality of readers 314 are all spaced apart from one another by a dielectric material, such as alumina, and the electrical connections of each writer 312 and reader 314 are recessed from the MFS in the y-direction. While only eight writer 312 and reader 314 pairs are shown in FIG. 3B, the SGV module 302 may comprise a greater or fewer number of writer 312 and reader 314 pairs. For example, in some embodiments, the SGV module comprises 16 writer 312 and reader 314 pairs. Similarly, while two servo readers 341 are shown in FIG. 3B, the SGV module may comprise a greater or fewer number of servo readers 341, such as two, four, or six servo readers 341. As such, the number of writer 312 and reader 314 pairs and the number of servo readers 341 is not intended to be limiting.

In some embodiments, the writers 312 and the readers 314 may be offset or unaligned in the x-direction when the tape head 300 is tilted with respect to the tape. Examples of tilted SGV modules having offset writers and readers are described in co-pending patent application titled "Magnetic Recording Head Having Same-Gap Read-After-Write," U.S. application Ser. No. 17/232,704, filed Apr. 16, 2021, assigned to the same assignee of this application, which is herein incorporated by reference.

FIGS. 4A-4E illustrate a process of coating the plurality of writers 312 of a SGV module head assembly 302 in a first overcoat 460 and coating the plurality of readers 314 of the SGV module head assembly 302 in a second overcoat 462, according to one embodiment. The SGV module 302 of FIGS. 4A-4E may be either the first SGV module 302a or the second SGV module 302b of FIG. 3A, or the SGV module 302 of FIG. 3B. The SGV module 302 may be a part of the tape head 300 of FIG. 3A. Further details of the writers 312 and readers 314 are shown below in FIG. 5.

Figure 4A:
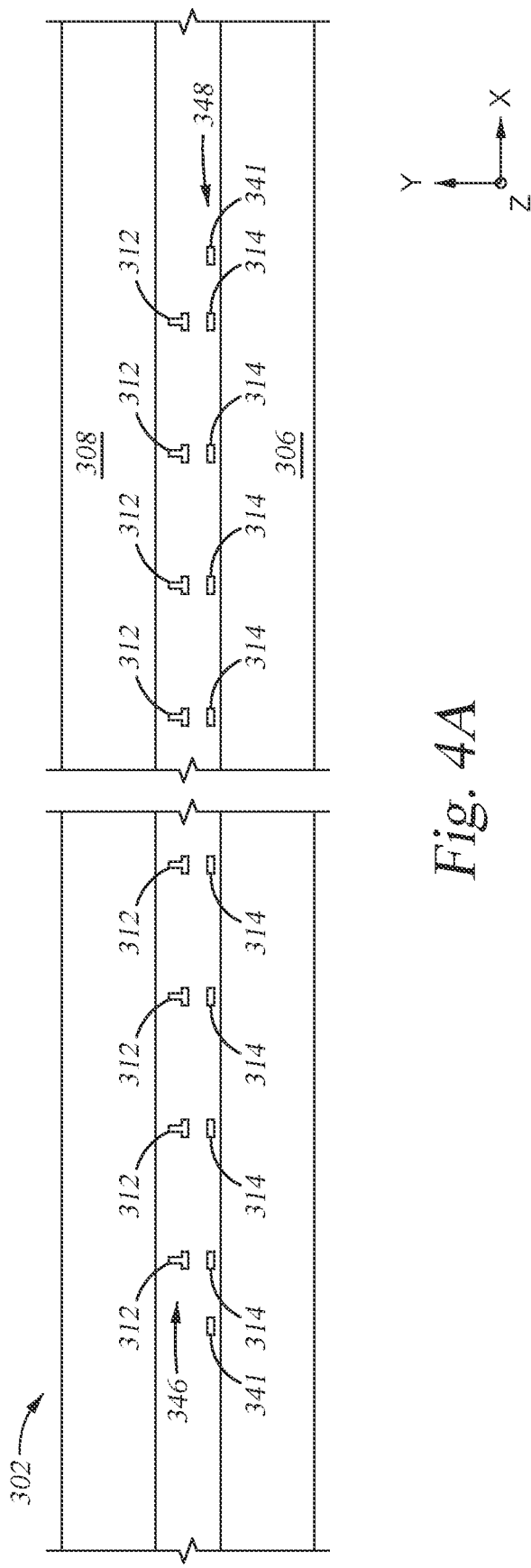
FIGS. 4A-4E illustrate a process of coating the plurality of writers in a first overcoat and coating the plurality of readers in a second overcoat, according to one embodiment.

FIG. 4A illustrates an MFS view of the writers 312 and the readers 314 disposed between the substrate 306 and the closure 308 after formation of the writers 312 and readers 314. The writers 312 and readers 314 may be formed by any known methods and in any order (e.g., the readers 314 may be formed prior to forming the writers 312, or vice versa). While not shown, each writer 312 and reader 314 pair may comprise an optional null shield disposed therebetween. Furthermore, while the first row 346 of writers 312 is disposed adjacent to the closure 308 and the second row 348 of readers 314 is disposed adjacent to the substrate 306, the first row 346 of writers 312 may be disposed adjacent to the substrate 306 and the second row 348 of readers 314 may be disposed adjacent to the closure 308.

Figure 4B:
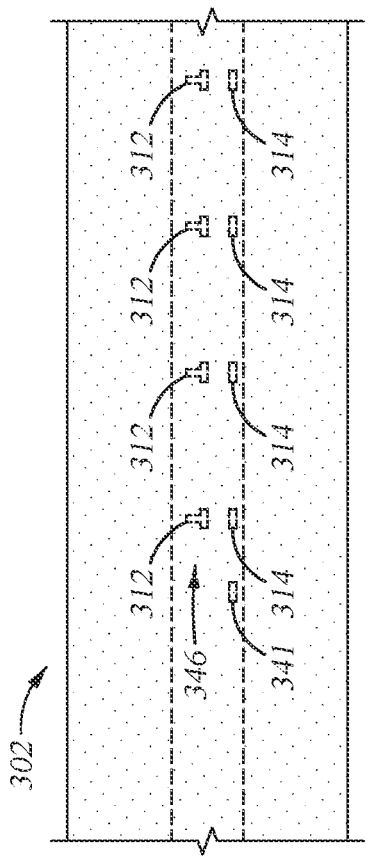
Figure 4B:
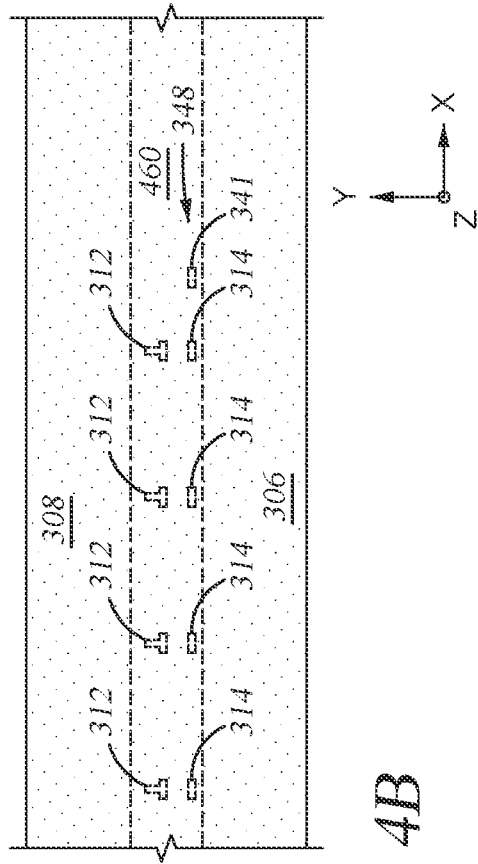

In FIG. 4B, the first row 346 of writers 312, the second row 348 of readers 314, at least a portion of the closure 308, and at least a portion of the substrate 306 are etched or milled for about 10 seconds (which may vary depending on the machine or tool used) to clean the exposed surface at the MFS. Etching the writers 312, readers 314, closure 308, and substrate 306 may remove a small layer or portion of material from each of the writers 312, readers 314, closure 308, and substrate 306, such as about 10 nm. Upon etching, a first overcoat 460 is deposited over each of the first row 346 of writers 312, the second row 348 of readers 314, at least a portion of the closure 308, and at least a portion of the substrate 306. The first overcoat 460 has a thickness in the y-direction of about 2 nm to about 12 nm. The first overcoat 460 may comprise alumina, silicon nitride, diamond like carbon, among others.

Figure 4C:
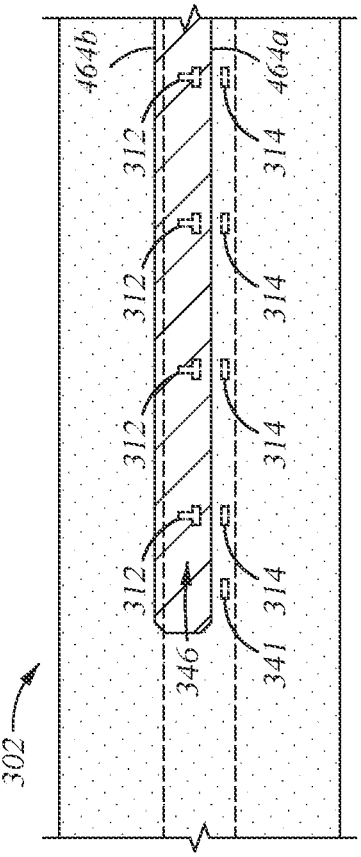
Figure 4C:
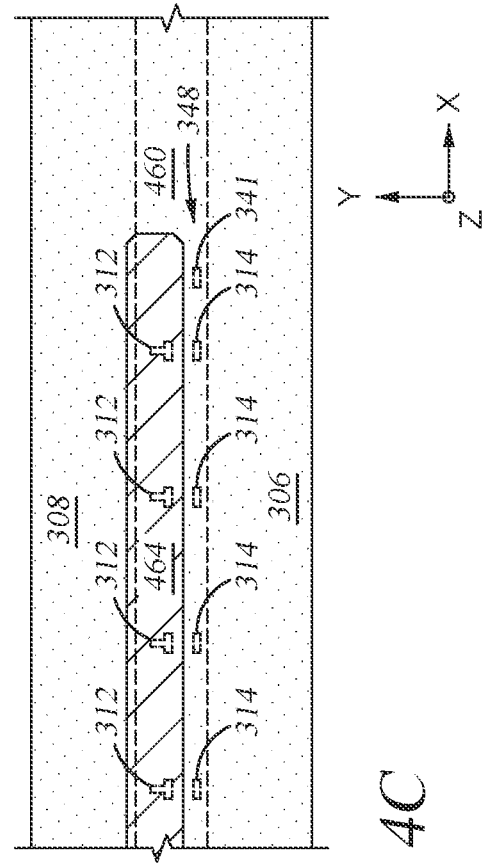

As shown in FIG. 4C, a photoresist 464 is disposed over at least the first row 346 of writers 312. The photoresist 464 may optionally be disposed over at least a portion of the closure 308. The photoresist 464 has a thickness in the y-direction of about 1 μm to about 5 μm. An edge 464a of the photoresist 464 is spaced a distance in the y-direction of about 2 μm to about 5 μm from an adjacent surface of each reader 314 in the second row 348. The placement of the edge 464a of the photoresist 464 is critical so that the photoresist 464 is not placed over the second row 348 of readers 314. Conversely, the edge 464b of the photoresist 464 disposed adjacent to the closure 308 opposite the edge 464a may extend over the closure 308, in part or in whole, so long as the entire first row 346 of writers 312 is entirely covered by the photoresist 464 in both the x-direction and the z-direction.

Figure 4D:
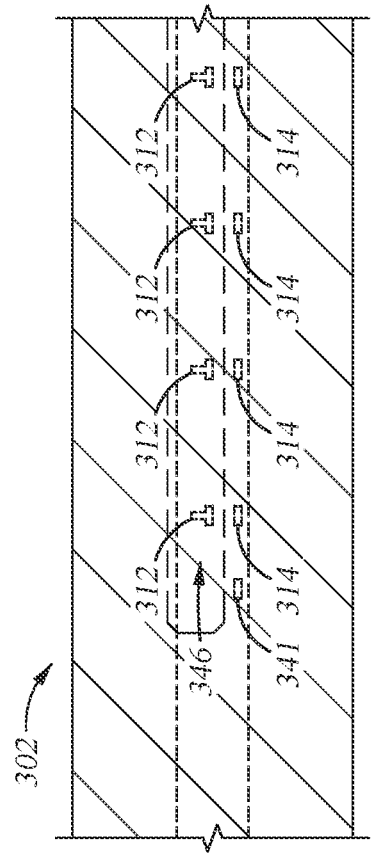
Figure 4D:
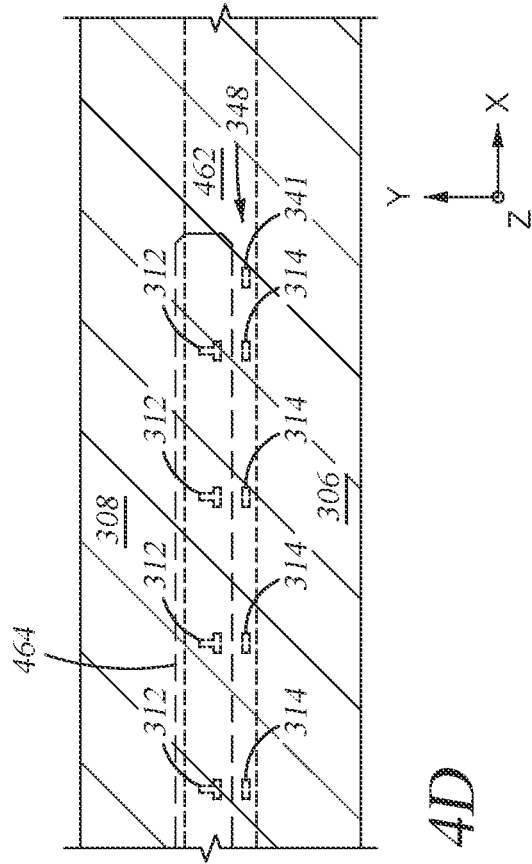

In FIG. 4D, the second row 348 of readers 314, the photoresist 464, at least a portion of the closure 308, and at least a portion of the substrate 306 are etched or milled for about 1 minute to remove the first overcoat 460 and to clean the newly exposed surface of the second row 348 of readers 314, the closure 308, the substrate 306 at the MFS. During the etch, portions of the photoresist 464 may be removed; however, the entirety of the photoresist 464 is not removed, and thus, remains covering the first row 346 of writers 312 and the first overcoat 460 disposed on the writers 312. Thus, upon etching, the first overcoat 460 remains only over the writers 312 under the photoresist 464. The etch may remove a small layer or portion of material from each of the readers 314, closure 308, and substrate 306, such as about 1 nm to about 10 nm. As such, the readers 314 may be recessed further from the MFS than the writers 312.

As shown in FIG. 4D, upon etching, the second overcoat 462 is disposed over the second row 348 of readers 314, and optionally, over at least a portion of the substrate 306 and/or closure 308. As shown, the second overcoat 462 covers the second row 348 of readers 314, the substrate 306, and the majority of the closure 308. The second overcoat 462 has a thickness in the y-direction of about 2 nm to about 25 nm. Thus, the second overcoat 462 is thicker than the first overcoat 460 by about 0 nm to about 23 nm, such as about 1 nm to about 15 nm. The second overcoat 462 may comprise alumina, silicon nitride, diamond like carbon, among others. The second overcoat 462 and the first overcoat 460 may comprise different materials or the same material. Furthermore, the second overcoat 462 may have a different thickness than the first overcoat 460. For example, the second overcoat 462 disposed over the readers 314 may be thicker than the first overcoat 460 disposed over the writers 312 for reliability. Both the first overcoat 460 and the second overcoat 462 may be as thin as possible without sacrificing the reliability of the SGV module 302 and/or tape head.

Figure 4E:
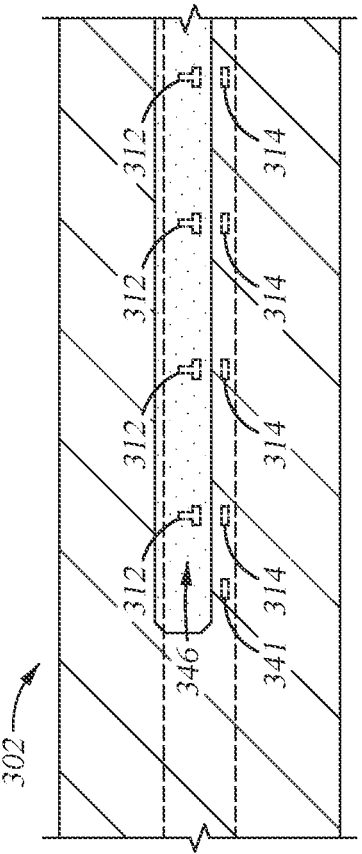
Figure 4E:
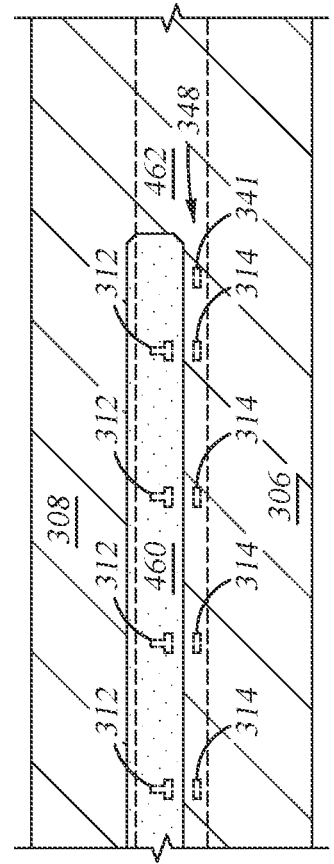

In FIG. 4E, the photoresist 464 is removed. Upon removing the photoresist 464, the first overcoat 460 is disposed over the writers 312 and a small portion of the closure 308, and the second overcoat 462 is disposed over the readers 314, the substrate 306, and a large portion of the closure 308. In embodiments where the SGV module 302 comprises a null shield, the null shield may be coated with the first overcoat 460, the second overcoat 462, or a combination thereof.

While FIGS. 4A-4E illustrate and discuss depositing the first overcoat 460 over the writers 312 and the second overcoat 462 over the readers 314 (and the substrate 306 and/or closure 308), the readers 314 may instead be coated with the first overcoat 460, and then protected or covered by the photoresist 464 while the second overcoat 462 is deposited over the writers 312 (and the substrate 306 and/or closure 308). The process described above would remain the same with respect to depositions, etching and cleaning, and removal of the excess first overcoat 460 and photoresist 464.

Figure 5:
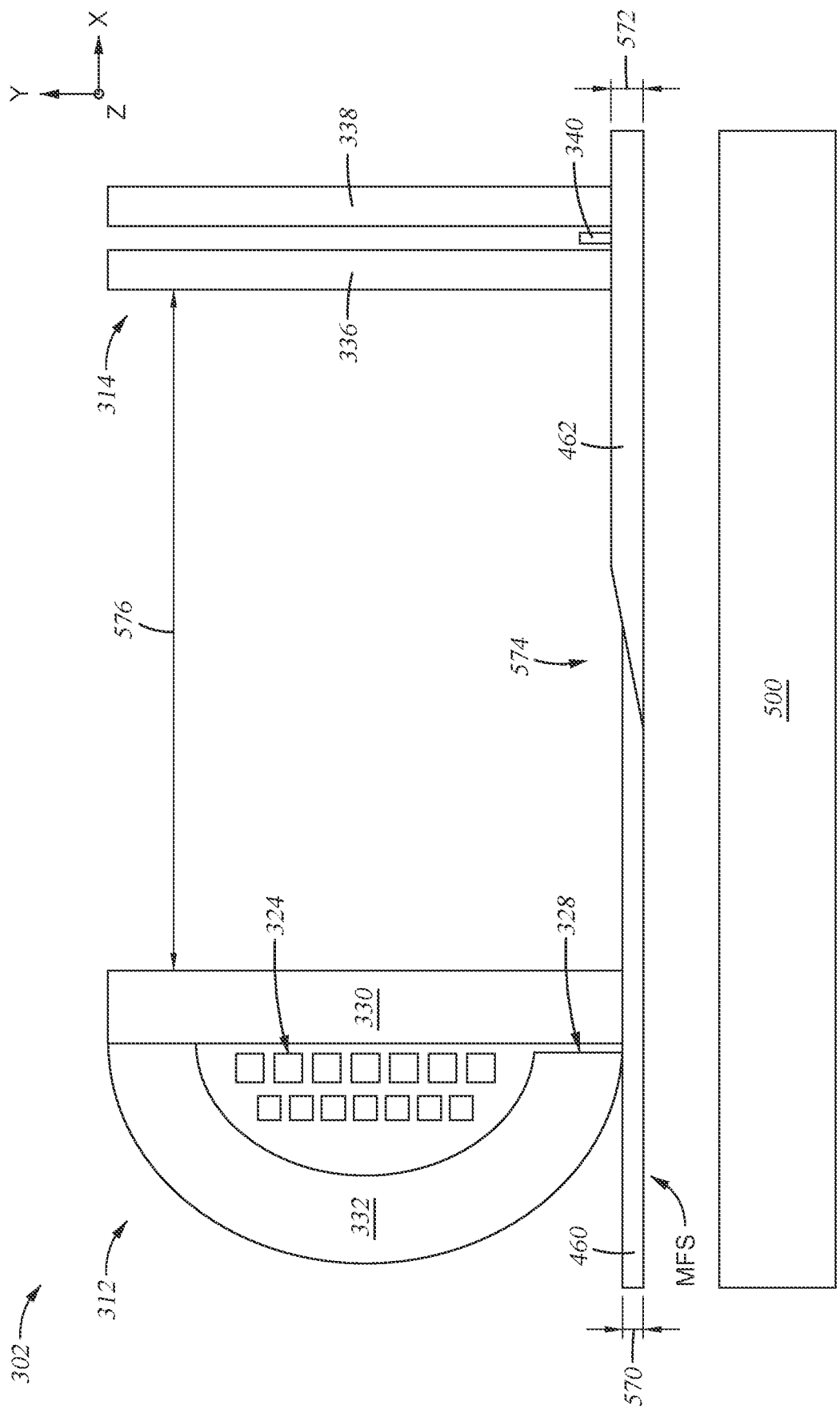
FIG. 5 illustrates a cross-sectional view of the coated SGV module of FIG. 4E disposed over a media or tape, according to one embodiment.

FIG. 5 illustrates a cross-sectional view of the coated SGV module 302 of FIG. 4E disposed over a media or tape 500, according to one embodiment. FIG. 5 illustrates only one writer 312 and reader 314 pair. While not shown in FIG.

5, a null shield may be disposed between the writer 312 and the reader 314. Furthermore, while the substrate 306 and closure 308 are not shown in FIG. 5, at least a portion of both the substrate 306 and the closure 308 are covered by the first overcoat 460 and/or the second overcoat 462.

The writer 312 comprises a write pole 330 coupled to a curved return pole 332. A write coil 324, which may comprise a core source and a return source is disposed between the write pole 330 and the return pole 332. The write pole 330 is spaced from the return pole 332 at the MFS by a write gap 328.

The reader 314 comprises a first shield 336, a second shield 338, and a magnetic sensor 340 disposed between the first and second shields 336, 338. The magnetic sensor 340 may be a tunnel magnetoresistance (TMR) sensor, for example. The magnetic sensor 340 comprises a free layer (not shown), among other layers, and the free layer may rotate due to flux generated from the writer 312. The first shield 336 is spaced a distance 576 in the x-direction from the write pole 330 of about 5 µm to about 15 µm.

As shown in FIG. 5, the first overcoat 460 is disposed entirely over the write pole 330, the write gap 328, and the return pole 332 of the writer 312 at the MFS. The first overcoat 460 has a thickness 570 in the y-direction of about 2 nm to about 12 nm. The second overcoat 462 is disposed entirely over the first shield, 336, the second shield 338, and the magnetic sensor 340 of the reader 314 at the MFS. The second overcoat 462 has a thickness 572 in the y-direction of about 2 nm to about 25 nm. Because the second overcoat 462 may be thicker than the first overcoat 460, the reader 314 may be disposed further from the media or tape 500 than the writer 312.

The first overcoat 460 and the second overcoat 462 may overlap at the intersection 574 between them. The intersection 574 between the first and second overcoats 460, 462 is where the edge 464a of the photoresist 464 was previously disposed. Both the first and second overcoats 460, 462 may be angled with respect to the MFS at the intersection 574. In embodiments where the SGV module 302 comprises a null shield, the null shield may be coated with the first overcoat 460, the second overcoat 462, or a combination thereof, for example if the null shield is disposed over the intersection 574.

By depositing the first and second overcoats at different times and in different processes during fabrication of the tape head, the materials and thicknesses of both the first and second overcoats may be individually selected for optimized use of the writers and readers of the tape head to enhance reliability of the tape head.

In one embodiment, a SGV module head assembly comprises a closure, a plurality of write transducers disposed in a first row on the closure, the plurality of write transducers being coated with a first overcoat at a media facing surface (MFS), a plurality of read transducers disposed in a second row adjacent to the first row on the closure, each read transducer being paired with an adjacent write transducer, and each write transducer and read transducer of each pair being aligned in a downtrack direction, wherein each read transducer is coated with a second overcoat at the MFS, the second overcoat having a greater thickness than the first overcoat, and a substrate disposed adjacent to the second row, wherein at least a portion of the substrate is coated with the second overcoat at the MFS.

The write transducer and the read transducer of each pair are spaced a first distance in the downtrack direction of about 5 µm to about 20 µm, such that the SGV module head assembly is controllable to write data to a tape using the write transducer of each pair and read verify the data using the read transducer of each pair. The first overcoat comprises a different material than the second overcoat. The first overcoat and the second overcoat each individually comprise one of alumina, silicon nitride, or diamond like carbon. The second overcoat is thicker than the first overcoat by about 1 nm to about 23 nm. At least a portion of the closure is coated with the second overcoat at the MFS. At least a portion of the closure is coated with the first overcoat at the MFS. The first overcoat and the second overcoat are deposited at different times and in different processes during fabrication. A tape drive comprises the SGV module head assembly, and a controller configured to control the SGV module head assembly to write data to the tape using the write transducer of each pair and read verify the data using the read transducer of each pair.

In another embodiment, a method of fabricating a SGV module head assembly comprises forming a plurality of write transducers in a first row adjacent to a closure and a plurality of read transducers in a second row adjacent to the first row and a substrate, each read transducer being paired with an adjacent write transducer, and each write transducer and read transducer of each pair being aligned in a downtrack direction, wherein each read transducer is coated with a second overcoat at a MFS, depositing a first overcoat on the plurality of write transducers, the plurality of read transducers, at least a portion of the closure, and at least a portion of the substrate at the MFS, depositing a photoresist over at least the plurality of write transducers, removing portions of the first overcoat uncovered by the photoresist, depositing a second overcoat on the plurality of read transducers, at least a portion of the closure, and at least a portion of the substrate at the MFS, and removing the photoresist.

The method further comprises etching the plurality of write transducers, the plurality of read transducers, the closure, and the substrate prior to depositing the first overcoat. The first row of the plurality of write transducers and the second row of the plurality of read transducers are spaced a first distance in the downtrack direction of about 5 µm to about 20 µm, such that the SGV module head assembly is controllable to write data to a tape using the write transducer of each pair and read verify the data using the read transducer of each pair. The first overcoat comprises at least one of a different material, a different thickness, or a different etch process than the second overcoat. The first overcoat has a thickness at the MFS of about 2 nm to about 12 nm, and wherein the second overcoat has a thickness at the MFS of about 2 nm to about 25 nm. Removing the portions of the first overcoat uncovered by the photoresist further removes a portion of the plurality of read transducers at the MFS. An edge of the photoresist is disposed between the first row and the second row, and wherein the edge of the photoresist is spaced a distance of about 5 µm to about 10 µm from the second row of the plurality of read transducers. The method further comprises forming a third row of null shields between the first row of the plurality of write transducers and the second row of the plurality of read transducers. The third row of null shields is coated in the first overcoat, the second overcoat, or a combination thereof. The first overcoat and the second overcoat each individually comprise one of alumina, silicon nitride, or diamond like carbon. A tape drive comprises the SGV module head assembly formed by the method, and a controller configured to control the SGV module head assembly to write data to the tape using the write transducer of each pair and read verify the data using the read transducer of each pair.

In yet another embodiment, a SGV module head assembly comprises a substrate, a plurality of write transducers disposed in a first row on the substrate, the plurality of write transducers being coated with a first overcoat at a MFS, a plurality of read transducers disposed in a second row adjacent to the first row, each read transducer being coated with a second overcoat at the MFS, a plurality of null shields disposed in a third row between the first row and the second row, wherein each read transducer is paired with an adjacent write transducer and an adjacent null shield, each write transducer, read transducer, and null shield of each pair being aligned in a downtrack direction, and a closure disposed adjacent to the second row, wherein at least a portion of the closure is coated with the second overcoat at the MFS, wherein the first overcoat and the second overcoat are deposited at different times and in different processes during fabrication.

The write transducer and the read transducer of each pair are spaced a first distance in the downtrack direction of about 5 µm to about 20 µm, such that the SGV module head assembly is controllable to write data to a tape using the write transducer of each pair and read verify the data using the read transducer of each pair. The first overcoat comprises a different material than the second overcoat, and wherein the second overcoat has a thickness equal to or greater than a thickness of the first overcoat. At least a portion of the substrate is coated with either the first overcoat or the second overcoat at the MFS. A tape drive comprises the SGV module head assembly, and a controller configured to control the SGV module head assembly to write data to the tape using the write transducer of each pair and read verify the data using the read transducer of each pair.

While the foregoing is directed to embodiments of the present disclosure, other and further embodiments of the disclosure may be devised without departing from the basic scope thereof, and the scope thereof is determined by the claims that follow.

What is claimed is:

1. A same gap verify (SGV) module head assembly, comprising:
   a closure;
   a plurality of write transducers disposed in a first row on the closure, the plurality of write transducers being coated with a first overcoat at a media facing surface (MFS);
   a plurality of read transducers disposed in a second row adjacent to the first row on the closure, each read transducer being paired with an adjacent write transducer, and each write transducer and read transducer of each pair being aligned in a downtrack direction, wherein each read transducer is coated with a second overcoat at the MFS, the second overcoat having a greater thickness than the first overcoat; and
   a substrate disposed adjacent to the second row, wherein at least a portion of the substrate is coated with the second overcoat at the MFS.

2. The SGV module head assembly of claim 1, wherein the write transducer and the read transducer of each pair are spaced a first distance in the downtrack direction of about 5 µm to about 20 µm, such that the SGV module head assembly is controllable to write data to a tape using the write transducer of each pair and read verify the data using the read transducer of each pair.

3. The SGV module head assembly of claim 1, wherein the first overcoat comprises a different material than the second overcoat, and wherein the first overcoat and the second overcoat each individually comprise one of alumina, silicon nitride, or diamond like carbon.

4. The SGV module head assembly of claim 1, wherein the second overcoat is thicker than the first overcoat by about 1 nm to about 23 nm.

5. The SGV module head assembly of claim 1, wherein at least a portion of the closure is coated with the second overcoat at the MFS.

6. The SGV module head assembly of claim 1, wherein at least a portion of the closure is coated with the first overcoat at the MFS.

7. The SGV module head assembly of claim 1, wherein the first overcoat and the second overcoat are deposited at different times and in different processes during fabrication.

8. A tape drive, comprising:
   the SGV module head assembly of claim 1; and
   a controller configured to control the SGV module head assembly to write data to a tape of the tape drive using the write transducer of each pair and read verify the data using the read transducer of each pair.

9. A tape drive, comprising:
   a same gap verify (SGV) module head assembly formed by a method comprising:
      forming a plurality of write transducers in a first row adjacent to a closure and a plurality of read transducers in a second row adjacent to the first row and a substrate, each read transducer being paired with an adjacent write transducer, and each write transducer and read transducer of each pair being aligned in a downtrack direction;
      depositing a first overcoat on the plurality of write transducers, the plurality of read transducers, at least a portion of the closure, and at least a portion of the substrate at the MFS;
      depositing a photoresist over at least the plurality of write transducers;
      removing portions of the first overcoat uncovered by the photoresist;
      depositing a second overcoat on the plurality of read transducers, at least a portion of the closure, and at least a portion of the substrate at the MFS, wherein the first overcoat comprises at least one of a different material or a different thickness than the second overcoat; and
      removing the photoresist; and
   a controller configured to control the SGV module head assembly to write data to a tape of the tape drive using the write transducer of each pair and read verify the data using the read transducer of each pair.

10. The tape drive of claim 9, wherein the method further comprises etching the plurality of write transducers, the plurality of read transducers, the closure, and the substrate prior to depositing the first overcoat.

11. The tape drive of claim 9, wherein the first row of the plurality of write transducers and the second row of the plurality of read transducers are spaced a first distance in the downtrack direction of about 5 µm to about 20 µm, such that the SGV module head assembly is controllable to write data to a tape using the write transducer of each pair and read verify the data using the read transducer of each pair.

12. The tape drive of claim 9, wherein the first overcoat has a thickness at the MFS of about 2 nm to about 12 nm, and wherein the second overcoat has a thickness at the MFS of about 2 nm to about 25 nm.

13. The tape drive of claim 9, wherein removing the portions of the first overcoat uncovered by the photoresist further removes a portion of the plurality of read transducers at the MFS.

14. The tape drive of claim 9, wherein an edge of the photoresist is disposed between the first row and the second row, and wherein the edge of the photoresist is spaced a distance of about 5 µm to about 10 µm from the second row of the plurality of read transducers.

15. The tape drive of claim 9, wherein the method further comprises forming a third row of null shields between the first row of the plurality of write transducers and the second row of the plurality of read transducers.

16. The tape drive of claim 15, wherein the third row of null shields is coated in the first overcoat, the second overcoat, or a combination thereof.

17. The tape drive of claim 9, wherein the first overcoat and the second overcoat each individually comprise one of alumina, silicon nitride, or diamond like carbon.

18. A same gap verify (SGV) module head assembly, comprising:
    a substrate;
    a plurality of write transducers disposed in a first row on the substrate, the plurality of write transducers being coated with a first overcoat at a media facing surface (MFS);
    a plurality of read transducers disposed in a second row adjacent to the first row, each read transducer being coated with a second overcoat at the MFS;
    a plurality of null shields disposed in a third row between the first row and the second row, wherein each read transducer is paired with an adjacent write transducer and an adjacent null shield, each write transducer, read transducer, and null shield of each pair being aligned in a downtrack direction; and
    a closure disposed adjacent to the second row, wherein at least a portion of the closure is coated with the second overcoat at the MFS, wherein the first overcoat and the second overcoat are deposited at different times and in different processes during fabrication.

19. The SGV module head assembly of claim 18, wherein the write transducer and the read transducer of each pair are spaced a first distance in the downtrack direction of about 5 µm to about 20 µm, such that the SGV module head assembly is controllable to write data to a tape using the write transducer of each pair and read verify the data using the read transducer of each pair.

20. The SGV module head assembly of claim 18, wherein the first overcoat comprises a different material than the second overcoat, and wherein the second overcoat has a thickness equal to or greater than a thickness of the first overcoat.

21. The SGV module head assembly of claim 18, wherein at least a portion of the substrate is coated with either the first overcoat or the second overcoat at the MFS.

22. A tape drive, comprising:
    the SGV module head assembly of claim 18; and
    a controller configured to control the SGV module head assembly to write data to a tape of the tape drive using the write transducer of each pair and read verify the data using the read transducer of each pair.

* * * * *